United States Patent [19]

Blount, Jr. et al.

[11] Patent Number: 5,378,757
[45] Date of Patent: Jan. 3, 1995

[54] WATER-DISSIPATABLE ALKYD RESINS AND COATINGS PREPARED THEREFROM

[75] Inventors: William W. Blount, Jr.; Thauming Kuo, both of Kingsport, Tenn.

[73] Assignee: Eastman Chemical Company, Kingsport, Tenn.

[21] Appl. No.: 153,232

[22] Filed: Nov. 15, 1993

[51] Int. Cl.$^6$ .......................... C08J 3/00; C08G 63/48
[52] U.S. Cl. .......................... 524/608; 528/272/275; 528/293; 528/295; 528/295.5; 528/296; 528/298; 528/300; 528/301; 528/302; 528/306; 528/308; 528/308.6; 529/437; 529/438; 529/440; 529/444; 524/601; 524/603; 524/604; 524/605; 524/609
[58] Field of Search .............. 528/272, 275, 293, 295, 528/295.5, 296, 298, 300, 301, 302, 306, 308, 308.6; 525/437, 438, 440, 444; 524/601, 603, 604, 605, 608, 609; 428/480, 482

[56] References Cited

U.S. PATENT DOCUMENTS

| | | | |
|---|---|---|---|
| 3,345,313 | 10/1967 | Ruhf et al. | 524/601 |
| 3,434,987 | 3/1969 | Dhein et al. | 106/252 |
| 3,494,882 | 2/1970 | Andrews | 524/557 |
| 3,549,577 | 12/1970 | Stromberg | 524/598 |
| 3,666,698 | 5/1972 | Harris et al. | 528/295.5 |
| 3,699,066 | 10/1972 | Hunsucker | 523/402 |
| 3,734,874 | 5/1973 | Kibler et al. | 524/603 |
| 4,340,519 | 7/1982 | Kotera et al. | 523/414 |
| 4,525,524 | 6/1985 | Tung et al. | 524/601 |
| 4,698,391 | 10/1987 | Yacobucci et al. | 525/162 |
| 4,737,551 | 4/1988 | Dervan et al. | 525/440 |

OTHER PUBLICATIONS

Resin Formulations from Eastman Chemicals, Enamel Prepared From Alkyd Resin HA-9-1N, Publication No. N-286A, Jul. 1984.

*Primary Examiner*—Samuel A. Acquah
*Attorney, Agent, or Firm*—Mark A. Montgomery

[57] ABSTRACT

Disclosed is a water-dissipatable alkyd resin containing a sulfonate group. The alkyd resin is prepared by reacting at least one monoglyceride, a polycarboxylic acid, and a polyol sulfomonomer adduct containing at least one sulfonate group. The alkyd resin is useful to prepare cross-linked coatings such as obtained with oil based paints.

19 Claims, No Drawings

WATER-DISSIPATABLE ALKYD RESINS AND COATINGS PREPARED THEREFROM

FIELD OF THE INVENTION

The present invention relates to novel water-dissipatable alkyds which are useful as the primary film former for cross-linked coatings. More particularly, the present invention relates to unique dispersions of water-dissipatable alkyds that do not require organic co-solvents to impart "in can" or storage stability and have nearly zero "volatile organic compound" (VOC) content.

BACKGROUND OF THE INVENTION

Regulations to limit the amount of VOC content of industrial coatings have encouraged research and development to explore new technologies directed at reducing solvent emissions from industrial coatings operations such as automotive, appliance, general metal, furniture, and the like. One technology, the replacement of organic solvents with water, is of particular interest for the obvious reasons of availability, cost, and environmental acceptability.

Cross-linkable waterborne enamels have been prepared from each of the three primary industrial film-forming polymer types: polyesters, acrylics and alkyds. Each of these three polymer types can be made water dissipatable by neutralizing residual carboxylic acid groups (e.g. formation of an amine salt) or incorporating a surfactant combination selected to make the resin/water mixture emulsifiable. The amine (viz. ammonia) volatilizes from the curing film which increases the VOC.

Amine salts of acrylic polymers have a stable carbon backbone, but pendant ester groups (methyl, butyl, β-hydroxyethyl) are susceptible to saponification at high pH. The hydrolysis of pendant ester groups can lead to sediment formation and enamel instability.

Amine neutralized polyesters are also saponifiable; however, main chain bond cleavage results in loss of performance versus storage time. Scientists have attempted to retard or eliminate this effect through deliberate raw material selection to effect more stable ester linkages. It remains that, at best, amine neutralizable polyesters represent a short-term solution to provide the acknowledged benefits of waterborne coatings in the marketplace.

Thirdly, alkyd resins, with fewer ester linkages per unit weight due to the high weight contribution (45 to 85%) from C-18 fatty acid groups, are commercially available for use in manufacturing amine neutralized water-dissipatable paints. However, due to their oil-like or hydrophobic properties, alkyds require organic co-solvents for preparing satisfactory dispersions. The amount of solvent required is not insignificant with 1 pound or more of solvent per 3 pounds of alkyd resin being typical. Such high solvent demand makes it difficult to formulate compliant coatings with VOC target values less than 2.6 pounds organic volatiles per gallon of paint.

Some polymer types are known to be formed into aqueous, ion-containing polymer dispersions suitable for preparing storage stable paint. U.S. Pat. No. 4,340,519 discloses the composition of certain crystalline and non-crystalline polyesters copolymerized with a metal sulfonate group-containing aromatic acid and up to 10 mole percent (based on the total polyol content) of a polyvalent polyol selected from trimethylolpropane, trimethylolethane, glycerine, and pentaerythritol. U.S. Pat. No. 4,525,524 discloses liquid systems of polyesters containing certain metal sulfonates and, optionally, up to 3 percent of a branching agent based upon the total diol component.

Many patents disclose methods to obtain water-reducible polyesters and alkyds by neutralizing residual or unreacted carboxylic acid groups on the polymer with ammonia or various organic amines. U.S. Pat. No. 3,666,698 utilizes this method as well as phenylindandicarboxylic acid to modify coating performance. U.S. Pat. No. 3,699,066 shows the benefits of certain hydroxy-functional amines for neutralization. U.S. Pat. No. 3,549,577 utilizes the amino resin crosslinker as the neutralizing agent then adjusts the pH to prepare an alkaline water-reduced system. In these patents as well as U.S. Pat. Nos. 3,494,882, 3,434,987, BR. 1,117,126, and U.S. Pat. No. 3,345,313 carboxylic acid functionality is completely neutralized with excess base yielding an alkaline paint vehicle.

Although there are acceptable low VOC content polyesters and acrylics, the storage stability and resulting coating stability of polyesters and acrylics is significantly lower than alkyd resins. However, as stated above alkyds have high VOC content. It would, therefore, be very desirable to be able to produce a low VOC content alkyd resin that retains good storage stability and coating stability.

SUMMARY OF THE INVENTION

The process according to the present invention for the production of water-dissipatable alkyd resins comprises reacting:

(a) about 30 to 80 weight percent of a monobasic fatty acid, fatty ester or naturally occurring, partially saponified oil, (b) about 10 to 40 weight percent of a glycol or polyol, (c) about 10 to 40 weight percent of a polycarboxylic acid, and (d) a minor amount up to about 10 weight percent of a sulfomonomer or sulfomonomer adduct containing at least one sulfomonomer group, wherein the weight percent is based on the weight of sulfomonomer or sulfomonomer group, wherein, when the weight percentages of (a) through (d) are converted to their respective moles and equivalents, the total number of moles, $M_t$, divided by the total equivalents of acid functionality, $E_a$, is between 1.0 and 1.5 (K value); and the total equivalents of hydroxyl functionality, $E_{OH}$, divided by the total equivalents of acid functionality, $E_a$, is between 1.0 and 2.0 (R value).

The present invention also comprises a water-dissipatable alkyd resin composition prepared from the moieties of the reaction products above.

The present invention also comprises coating compositions containing the above composition, water, and optionally solvent, pigments, and other coating additives.

DETAILED DESCRIPTION OF THE INVENTION

The applicants have unexpectedly discovered an alkyd resin that can be formed into a coating composition with low VOC content while retaining good storage stability and good coating stability. The coating composition containing the water-dispersible alkyd resins of the present invention can contain significantly less solvent, less than 25 wt. % down to as low as 1 wt. % and even zero VOC content. The water-dissipatable alkyd resin used in the coating compositions of the present invention, while remaining dispersible in a substantial absence of an organic solvent, retains the desirable properties of an alkyd, producing coatings that have high gloss, fast cure, and good acid and caustic resistance.

A process according to the present invention for the production of water-dissipatable alkyd resins comprises reacting:

(a) about 30 to 80 weight percent of a monobasic fatty acid, fatty ester or naturally occurring, partially saponified oil, (b) about 10 to 40 weight percent of a glycol or polyol, (c) about 10 to 40 weight percent of a polycarboxylic acid, and (d) a minor amount up to about 10 weight percent of a sulfomonomer or sulfomonomer adduct containing at least one sulfomonomer group, wherein the weight percent is based on the weight of sulfomonomer or sulfomonomer group, wherein, when the weight percentages of (a) through (d) are converted to their respective moles and equivalents, the total number of moles, $M_t$, divided by the total equivalents of acid functionality, $E_a$, is between 1.0 and 1.5 (K value); and the total equivalents of hydroxyl functionality, $E_{OH}$, divided by the total equivalents of acid functionality, $E_a$, is between 1.0 and 2.0 (R value).

The total number of moles $M_t$ divided by the total equivalence of acid functionality $E_a$ is a quotient that is generally referred to as the K value. The K value is a measure of a resin's molecular weight which increases as the K value decreases to 1.00. The K value of the alkyd resins of the present invention is about 1.0 to 1.5 while a K value of about 1.00 to 1.25 is more preferred. Since higher molecular weight resins are better, K values that are closer to 1.00 are most preferred.

The total equivalency of hydroxy functionality $E_{OH}$, divided by the total equivalency of acid functionality $E_a$ is a quotient that is referred to as the R value and is proportional to the excess equivalents of hydroxyl functionality used in the resin synthesis. An excess of hydroxyl functionality is preferred, however this excess should not be so high as to render the resulting coating water sensitive. The R value of the alkyd resins of the present invention is about 1.0 to 2.0 with a R value of about 1.0 to 1.5 being more preferred.

The monobasic fatty acid, fatty ester, or naturally occurring-partially saponified oil is preferably selected from the formulae:

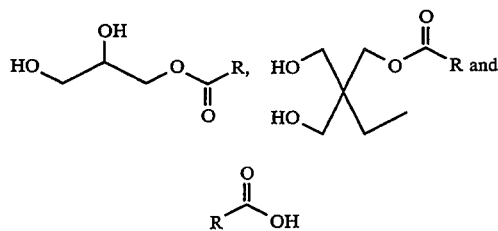

The preferred R group fatty acids have from 8 to 20 carbon atoms. The preferred R group fatty acids are the following:

LINOLEIC

LINOLENIC

OLEIC

The monobasic fatty acid, fatty ester or naturally occurring-partially saponified oil is preferably prepared by reacting a fatty acid or oil with a polyol. Examples of suitable oils include sunflower oil, canola oil, dehydrated castor oil, coconut oil, corn oil, cottonseed oil, fish oil, linseed oil, oiticica oil, soya oil, and tung oil, animal grease, castor oil, lard, palm kernel oil, peanut oil, perilla oil, safflower, tallow oil, walnut oil. Suitable examples of the fatty acid components of oil or fatty acids by themselves are selected from the following oil derived fatty acids; tallow acid, linoleic acid, linolenic acid, oleic acid, soya acid, myristic acid, linseed acid, crotonic acid, versatic acid, coconut acid, tall oil fatty acid, rosin acid, neodecanoic, neopentanoic, isostearic, 12-hydroxystearic, cottonseed acid with linoleic, linolenic and oleic being more preferred.

The glycol or polyol from (b) is preferably selected from aliphatic, alicyclic, and aryl alkyl glycols. Suitable examples of glycols include: ethylene glycol; propylene glycol; diethylene glycol; triethylene glycol; tetraethylene glycol; pentaethylene glycol; hexaethylene glycol; heptaethylene glycol; octaethylene glycol; nonaethylene glycol; decaethylene glycol; 1,3-propanediol; 2,4-dimethyl-2-ethyl-hexane-1,3-diol; 2,2-dimethyl-1,2-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-tetramethyl-1,6-hexanediol; thiodiethanol; 1,2-cyclohexanedimethanol; 1,3-cyclohexanedimethanol; 1,4-cyclohexanedimethanol; 2,2,4-trimethyl-1,3-pentanediol; 2,2,4-tetramethyl-1,3-cyclobutanediol; p-xylenediol hydroxypivalyl hydroxypivalate; 1,10-decanediol; hydrogenated bisphenol A; trimethylolpropane; trimethylolethane; pentaerythritol; erythritol; threitol; dipentaerythritol; sorbitol; glycerine; trimellitic anhydride; pyromellitic dianhydride; dimethylolpropicnic acid and the like.

The polycarboxylic acid used in (c) in the process and composition of the present invention is preferably selected from the group consisting of isophthalic acid, terephthalic acid, phthalic anhydride(acid), adipic acid, tetrachlorophthalic anhydride, dodecanedioic acid, sebacic acid, azelaic acid, 1,4-cyclohexanedicarboxylic acid, 1,3-cyclohexanedicarboxylic acid, maleic anhydride, fumaric acid, succinic anhydride(acid), 2,6-naphthalenedicarboxylic acid, glutaric acid and esters thereof.

The sulfomonomer or the sulfomonomer used in the sulfomonomer adduct of (d) is either a difunctional or a monofunctional monomer containing a —SO₃M group attached to an aromatic nucleus wherein M is hydrogen or a metal ion. When the sulfomonomer is a difunctional monomer component it is a dicarboxylic acid (or a derivative thereof) containing a SO₃M group. The metal ion of the sulfonate salt group may be either Na+, Li+, K+, Ca++, Cu++, Fe++, or Fe+++.

The —SO₃M group is attached to an aromatic nucleus, examples of which include benzene, naphthalene, anthracene, diphenyl, oxydiphenyl, sulfonyldiphenyl, and methylenediphenyl.

Especially good results are obtained when the difunctional monomer is the sodium salt of a sulfoisophthalic, sulfoterephthalic, sulfophthalic, or 4-sulfonaphthalene-2,7-dicarboxylic acid (or derivatives of such acids). A highly preferred such monomer is 5-sodiosulfoisophthalic acid or a derivative thereof such as dimethyl 5-sodiosulfoisophthalate. Other preferred difunctional monomers are lithium 5-sulfoisophthalic acid, dimethyl lithium 5-sulfoisophthalate, potassium 5-sulfoisophthalic acid, and dimethyl potassium 5-sulfoisophthalate.

Other effective difunctional monomers containing a —SO₃M group attached to an aromatic nucleus include metal salts of aromatic sulfonic acids (or esters thereof). These monomers have the general formula

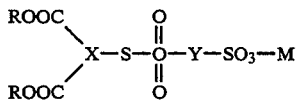

wherein X is a trivalent aromatic hydrocarbon radical, Y is a divalent aromatic hydrocarbon radical, R is hydrogen or an alkyl group of one to four carbon atoms, M is hydrogen Na+, Li+, or K+. Examples of preferred monomers here are 4-sodiosulfophenyl-3,5-dicarbomethoxybenzenesulfonate, 4-lithiosulfophenyl-3,5-dicarbomethoxybenzenesulfonate and 6-sodiosulfo-2-naphthyl-3,5-dicarbomethoxybenzenesulfonate.

Other effective difunctional monomers containing a —SO₃M group attached to an aromatic nucleus include metal salts of sulfodiphenyl ether dicarboxylic acids (or esters thereof). These monomers have the general formula

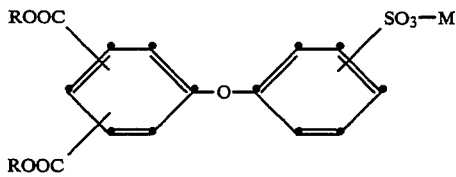

wherein R is hydrogen, an alkyl group of one to eight carbon atoms, or phenyl and M is hydrogen, K+, Na++, or Li+. These monomers are described, including methods for their preparation in Lappin, et al. Defensive Publication, 868 O.G. 730, on Nov. 18, 1969. Examples of preferred monomers here are dimethyl 5-[4-(sodiosulfo)phenoxy]isophthalate, dimethyl 5-[4-(sodiosulfo)phenoxy]terephthalate, and 5-[4-sodiosulfo)phenoxy]isophthalic acid. Other such monomers are disclosed in U.S. Pat. No. 3,734,874, incorporated herein by reference in its entirety.

The type and amount of metal sulfonate selected for water dispersability can be varied to obtain useful ion-containing alkyd resins. As little as 2 mole percent based on total carboxylic acid content will impart a significant degree of water miscibility, however, at least 3 percent is preferred. Water-soluble polyesters can be formulated with as much as 20 mole percent of the metal sulfonate; however, a practical upper limit based on the amount of branch-inducing intermediate required to counteract the water sensitivity effects is 9 percent and preferably 6 percent.

Metal sulfonates that are most preferred include 5-sodiosulfoisophthalic acid, dimethyl 5-sodiosulfoisophthalate, lithium 5-sulfoisophthalic acid, dimethyl lithium 5-sulfoisophthalate, potassium 5-sulfoisophthalic acid, dimethyl potassium 5-sulfoisophthalate, 3-sodiosulfobenzoic acid and the like.

Optionally, the sulfomonomer containing at least one sulfonate group that is reacted with a polyol to produce a diol sulfomonomer adduct can be a monofunctional sulfomonomer containing at least one sulfonate group that is thus reacted with a polyol containing at least three hydroxyl groups. The monofunctional sulfomonomer is preferably selected from the group of sulfomonomers of the formula:

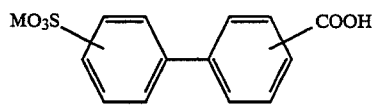

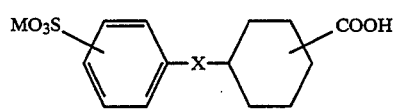

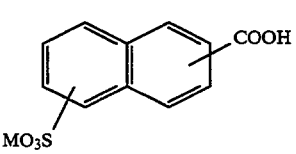

When the polyol sulfomonomer adduct is prepared by reacting a difunctional sulfomonomer with a polyol, the polyol is preferably a diol. Suitable examples of diols include the diols above with the following diols being more preferred: ethylene glycol, diethylene glycol, 2,2,4-trimethyl-i, 3-pentanediol, 1,4-cyclohexanedimethanol, 1,3-cyclohexanedimethanol, hydroxypivalyl hydroxypivalate, dipropylene glycol, 1,6-hexanediol, 1,10-decanediol, 1,3-butanediol, hydrogenated bisphenol A, 1,4-butanediol and neopentyl glycol. In addition to the amount of polyol reacted with the fatty acid, fatty ester or naturally occurring partially saponified oil according to the preferred step, and in addition to the polyol used in the preparation of the sulfomonomer adduct from a monofunctional sulfomonomer and additional amount of a polyol or other branching agent such as a polycarboxylic acid can be used to increase the molecular weight and branching of the alkyd of the present invention. These branching agents are preferably selected from trimethylolethane, pentaerythritol, erythritol, threitol, dipentaerythritol, sorbitol, glycerine, trimellitic anhydride, pyromellitic dianhydride, dimethylolpropionic acid, and trimethylolpropane.

A composition according to the present invention comprises a water-dissipatable alkyd resin made of the moieties of reaction products:
  (a) about 30 to 80 weight percent of a monobasic fatty acid, fatty ester or naturally occurring, partially saponified oil,
  (b) about 10 to 40 weight percent of a glycol or polyol,
  (c) about 10 to 40 weight percent of a polycarboxylic acid, and
  (d) a minor amount up to about 10 weight percent of a sulfomonomer or sulfomonomer adduct containing at least one sulfomonomer group, wherein the weight percent is based on the weight of sulfomonomer or sulfomonomer group,
wherein, when the weight percentages of (a) through (d) are converted to their respective moles and equivalents, the total number of moles, $M_t$, divided by the total equivalents of acid functionality, $E_a$, is between 1.0 and 1.5 (K value); and the total equivalents of hydroxyl functionality, $E_{OH}$, divided by the total equivalents of acid functionality, $E_a$, is between 1.0 and 2.0 (R value).

The alkyds of this invention can be styrenated (free-radical graft polymerized with styrene monomer), acrylated (free-radical graft polymerized with various acrylate monomers, preferably methyl methacrylate), chain stopped (chain terminated with benzoic acid or other aromatic monobasic acids) and other modifications well-known in the manufacture of alkyd resins used to modify application and performance properties.

The alkyd resin of the present invention can be formulated into a water-based coating composition that comprises about 10 to 50 weight percent of the water-dissipatable alkyd resin of above.

The coating compositions or enamels according to the present invention can contain in addition to pigment, a variety of paint additives to enhance flow, improve pigment dispersion, retard premature cure, retard mold growth, prevent sagging and other similar, practical paint producing methods. The coating composition according to the present invention further comprises paint driers, pigments, urea formaldehyde resins, melamine formaldehyde resins, and solvents.

Examples of such coating additives include flow control additives such as silicones, fluorocarbons, or cellulosics; coalescing solvents such as diethylene glycol monobutyl ether, trimethylpentanediol mono-isobutyrate, or ethylene glycol mono-octyl ether; strong acids such as p-toluenesulfonic acid, trichloroacetic acid, or trifluoromethanesulfonic acid; pigments such as titanium dioxide, barytes, clay, or calcium carbonate; colorants such as phthalocyanine blue, molybdate orange, or carbon black; biocides such as tin compounds (e.g., tributyltin oxide), quaternary ammonium compounds, or iodine compounds; thickeners such as carboxymethyl cellulose, hydroxypropyl methyl cellulose, ethyl hydroxyethyl cellulose, guar gum and the like.

The coating composition can be prepared by the techniques described herein and/or by techniques known in the art, e.g., as disclosed in U.S. Pat. Nos. 4,698,391, 4,737,551, and 3,345,313; the disclosures of which are incorporated herein by reference in their entirety.

The coating composition can be coated onto a substrate and cured using techniques known in the art; e.g. by spray-applying 3 to 4 mils of wet coating onto a metal panel, and heating in a 150° C. forced air oven for 30 minutes.

The substrate can be any common substrate such as paper; polyester films such as polyethylene or polypropylene; metals such as aluminum or steel; glass; urethane elastomers, primed (painted) substrates; and the like.

SCHEMES

The following three steps schematically describes the preferred process which provides a useful ion-containing alkyd resin:

Step 1: Pre-Processing the Oils and/or Fatty Acids

The required amount of oil and/or fatty acid is reacted with trimethylolpropane to yield monoglycerides or their trimethylolpropane analog as shown in Scheme 1. This reaction is conducted in Reactor Number 1. When this preparation step is used it must be completed separately to avoid formation of unreactive agglomerated particles in the final reaction mixture. This step is preferably conducted in a nitrogen sparged reactor between 180° C. and 250° C. until the extent of a fatty acid esterification is 99%.

Scheme 1
Step 1: Pre-Processing of Oils and Fatty Acids

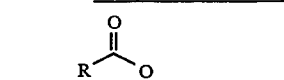

Scheme 1
Step 1: Pre-Processing of Oils and Fatty Acids

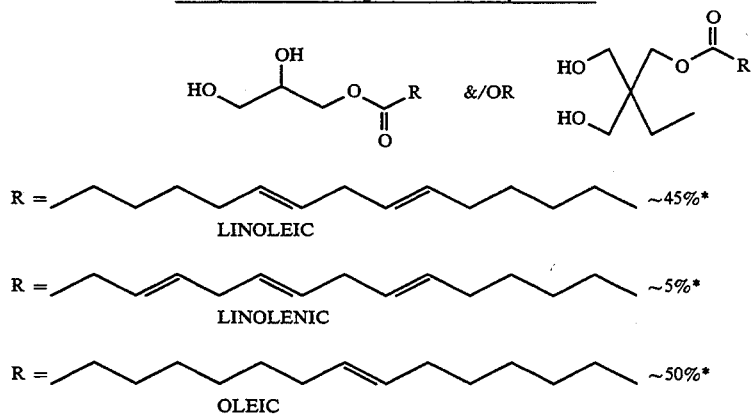

*Percentages vary with oil source selected for preparing the alkyd.

Step 2. Incorporation of SIP (5-Sodiosulfoisophthalic Acid.)

The second step involves reacting in a separate reactor a sulfomonomer containing at least one sulfonate group with a polyol to produce a polyolsulfomonomer adduct. In this instance Reactor Number 2 is charged SIP and the glycol, NPG. These are reacted to completion, i.e. to an acid value is less than 1.0 mg KOH/gram product. Scheme 2 depicts this reaction. Unreacted 5-SSIPA initiates side reactions leading to hazy, insoluble polymer. Thus when this step is used to prepare the sulfomonomer adduct the sulfomonomer should be completely reacted and the acid value must be between 0.25 and 1.0. This step is preferably conducted in a nitrogen sparged reactor between 160° C. and 200° C. until the extent of reaction of the sulfomonomer to form the sulfomonomer adduct is 99%.

Scheme 2
STEP 2 - INCORPORATION OF 5-SSIPA

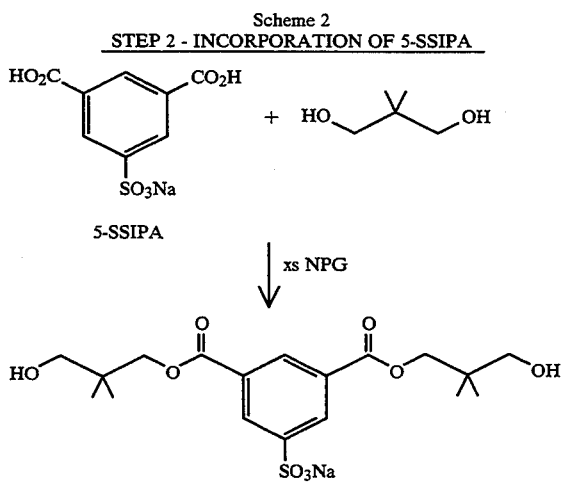

Step 3. Final Reaction

The products of Step 1 and Step 2 are combined with a polycarboxylic acid (isophthalic acid). Again, the reaction mixture is processed to nearly 99% extent of acid reaction whereby a clear, honey-colored alkyd resin is obtained. Scheme 3 shows schematically this final polymerization. Although not shown in the scheme, unreacted TMP and NPG are contained in the reaction products depicted in Schemes 1 and 2. This step is preferably conducted in a nitrogen sparged reactor between 180° C. and 250° C. until the extent of reaction of all acid groups is 99%.

Scheme 3
FINAL REACTION

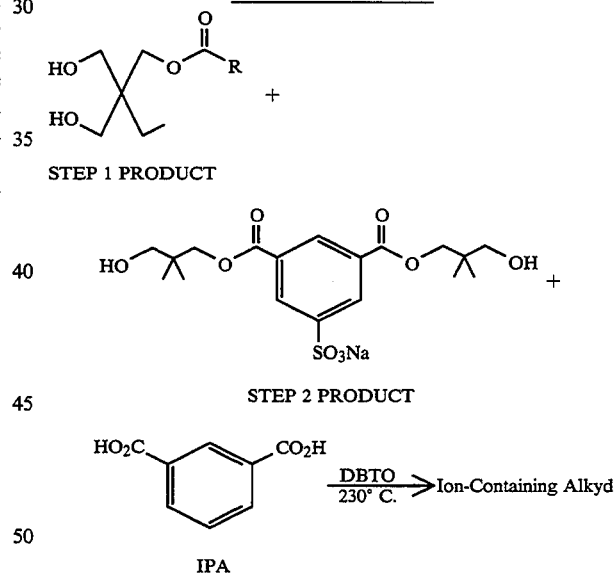

According to the preferred synthesis of the ion-containing (sulfonate) alkyd resins it is possible that many other staged processes could be used to provide a useful resin so long as an unsaturated fatty acid is prereacted to form monoglycerides or monoglyceride adduct (Scheme 1) and the ion-containing sulfonate intermediate is pre-reacted completely (Scheme 2) before being introduced to the complete reaction mixture (Scheme 3). For example additional stages could be used in place of the "complete reaction mixture" of Scheme 3 such as the addition of trimellitic anhydride or phthalic anhydride in a fourth stage to terminate polymer chains with carboxylic acid groups via a ring-opening hydroxyl-anhydride reaction.

It is also reasonable that the pre-reacted products of Schemes 1 or 2 could be added as separate stages themselves to other alkyd resin intermediates as could be conceived based on the technology taught herein.

In addition to trimethylolpropane, other useful branch-inducing materials include trimethylolethane, pentaerythritol, erythritol, threitol, dipentaerythritol, sorbitol, glycerine, trimellitic anhydride, pyromellitic dianhydride, dimethylolpropionic acid and the like.

The following examples are to illustrate the invention but should not be interpreted as a limitation thereon.

EXAMPLES

The coatings test procedures followed in presenting the examples and results of this invention are standard to the industry and are as follows:
1. Acid Value of resins (ASTM Method D 465)
2. Crosshatch Adhesion (ASTM D 3359-78)
3. Ford Cup Viscosity (ASTM Method D 1200)
4. Molecular Weight (Gel Permeation Chromatography)
5. Gardner-Holdt Bubble Viscosity (ASTM Method D 1545)
6. Film Thickness (General Electric Gage, Type B)
7. Film Hardness (Pencil Method)
8. Solvent resistance (Methylethyl ketone (MEK) dynamic rub test (see ASTM Method D 1308)
9. Staining Tests (ASTM Method D 1540)
10. Specular Gloss (ASTM Method D 523)
11. Hegmann Fineness-of-Dispersion (ASTM Method D 1210)
12. Conical Mandrel Test (Gardner devices)

Example 1

In this example a water-dissipatable ion-containing alkyd was prepared with trimethylolpropane as the branch-inducing monomer and tall oil fatty acid.

Step 1: A single-stage procedure was used to prepare the Reactor Number 1 product. The following materials were charged into a 1000-mL, four-necked reactor flask fitted with a stirrer, nitrogen sparge tube (0.4 scfh), nitrogen blanket source, and a ½-inch steel mesh packed partial condenser fitted with a Barett condensate trap and a total condenser:
  292.9 g (1.010 mol) Tall Oil Fatty Acid
  135.5 g (1.010 mol) Trimethylolpropane The reaction mixture was heated at about 3° C./min to 200° C. and the temperature maintained until the theoretical water had been collected and an acid value of less than 2 mg KOH/g product was reached. The product was a honey-colored syrup which slowly solidified on storage.

Step 2: In a similarly configured, separate reactor (Reactor Number 2) were charged
  52.6 g (0.505 mol) Neopentyl Glycol
  22.5 g (0.084 mol) 5-Sodiosulfoisophthalic Acid
  0.35 g Butylstannoic Acid Catalyst These reactants were also heated at about 3° C./min to a maximum temperature of 220° C. and this temperature maintained until the solution was "water-clear" and the acid value was less than 1 mg KOH/g product.

Step 3: The contents of both reactors was adjusted to 150° C. and the contents combined. To this mixture were added:
  244.4 g (1.471 mol) Isophthalic Acid
  26.3 g (0.196 mol) Trimethylolpropane
  0.35 g Butylstannoic Acid Catalyst The slurry was heated to 215° C. at 1° C./min and that temperature maintained until the theoretical condensate had been collected and an acid value of less than 10 mg KOH/g product was reached. The final ion-containing alkyd was very soluble in aromatic and oxygenated paint solvents, had a number average molecular weight of about 2500 and a weight average molecular weight of about 9000. The hydroxyl value was 51 mg KOH/g. The resin had a calculated K value of 1.038, R Value of 1.123, and percent fatty acid of 37.8.

Example 2

In this example a water-dissipatable ion-containing alkyd was prepared with trimethylolpropane as the branch-inducing monomer and sunflower oil.

Step 1: A single-stage procedure was used to prepare the Reactor 1 product using the oil-split procedure. The following materials were charged into a 1000-mL, four-necked reactor flask fitted with a stirrer, nitrogen sparge tube (0.4 scfh), nitrogen blanket source, and a ½-inch steel mesh packed partial condenser fitted with a Barett condensate trap and a total condenser:
  334.5 g (0.370 mol) Sunflower Oil
  76.4 g (0.570 mol) Trimethylolpropane
  0.48 g Dibutyltin oxide catalyst The DBTO served as an ester interchange catalyst to effect the oil split. The mixture was heated at about 3° C./min to 230° C. and this temperature maintained for about 3 hours or until the mixture was soluble in methanol and gave a clear, non-turbid solution. The product was a honey-colored syrup which did not crystallize on storage.

Step 2: In a similarly configured, separate reactor (Reactor II) were charged
  49.8 g (0.478 mol) Neopentyl Glycol
  22.5 g (0.084 mol) 5-Sodiosulfoisophthalic Acid
  0.32 g Butylstannoic Acid Catalyst These reactants were also heated at about 3° C./min to a maximum temperature of 220° C. and this temperature maintained until the solution was "water-clear" and the acid value was less than 1 mg KOH/g product.

Step 3: The contents of Reactor 1 and 2 were cooled to 150° C. and combined. To this mixture were added
  246.7 g (1.471 mol) Isophthalic Acid
  26.6 g (0.196 mol) Trimethylolpropane The slurry was heated to 215° C. at 1° C./min and that temperature maintained until the theoretical condensate had been collected and an acid value of less than 10 mg KOH/g product was reached. The final ion-containing alkyd was very soluble in aromatic and oxygenated paint solvents, had a number average molecular weight of about 2500 and a weight average molecular weight of about 9000. The hydroxyl value was 51 mg KOH/g. The resin had a calculated K value of 1.017, R value of 1.254, and percent oil of 44.2.

Example 3

In this example a water-dissipatable ion-containing alkyd was prepared with trimellitic anhydride as the branch-inducing monomer and tall oil fatty acid.

Step 1: A single-stage procedure was used to prepare the Reactor 1 product. The following materials were charged into a 1000-mL, four-necked reactor flask fitted with a stirrer, nitrogen sparge tube (0.4 scfh), nitrogen blanket source, and a ½-inch steel mesh packed partial condenser fitted with a Barett condensate trap and a total condenser:
  292.9 g (1.010 mol) Tall Oil Fatty Acid
  135.5 g (1.010 mol) Trimethylolpropane The reaction mixture was heated at about 3° C./min to 200° C. and the temperature maintained until the theoretical water had been collected and an acid value of less than 2 mg KOH/g product was reached. The product was a honey-colored syrup which slowly crystallized on storage.

Step 2: In a similarly configured, separate reactor (Reactor II) were charged 84.7 g (0.814 mol) Neopentyl Glycol
22.5 g (0.084 mol) 5-Sodiosulfoisophthalic Acid
0.35 g Butylstannoic Acid Catalyst These reactants were also heated at about 3° C./min to a maximum temperature of 220° C. and this temperature maintained until the solution was "water-clear" and the acid value was less than 1 mg KOH/g product.

Step 3: The contents of Reactor 1 and 2 were cooled to 150° C. and combined. To this mixture were added:

197.9 g (1.191 mol) Isophthalic Acid
37.6 g (0.196 mol) Trimellitic Anhydride
0.35 g Butylstannoic Acid Catalyst The slurry was heated to 215° C. at 1° C./min and that temperature maintained until the theoretical condensate had been collected and an acid value of less than 10 mg KOH/g product was reached. The final ion-containing alkyd was very soluble in aromatic and oxygenated paint solvents, had a number average molecular weight of about 2500 and a weight average molecular weight of about 9000. The hydroxyl value was 51 mg KOH/g.

Example 4

This example shows the preparation of a pre-dispersion of the ion-containing alkyd in water/isopropanol.

Equal weights of distilled water, isopropanol, and the alkyd resin were prepared. The water and isopropanol were added to a stirred reactor and heated to reflux. The reactor was also fitted with a nitrogen sparge, thermocouple, and an addition funnel supplied with a stopcock/metering valve assembly. At reflux, the alkyd resin was added to the reactor and reflux continued for about one hour. After that time, the alkyd resin had been completely dispersed to give a bluish/white pre-dispersed product.

In this manner, 50 grams water and 50 grams isopropanol were refluxed. The alkyd resin of Example 1, 50 grams, were added with reflux to obtain the predispersion.

Example 5

This example shows the addition of driers to the pre-dispersion and the preparation of a solvent free clear enamel.

Paint driers can be added to the neat (undiluted) resin but preferably should be added to the pre-dispersion of Example 4. Attempts to add them to the final aqueous dispersion generally result in drier incompatibility or coagulation of the drier solution.

This example shows the preparation of the final dispersion having zero VOC.

To the predispersion of Example 4 were added, with stirring the following driers; 0.03 g (0.06%) Cobalt Hydrocure (Mooney Chemical) and 0.015 g (0.03%) Manganese Hydrocure (Mooney).

Using the addition funnel described in Example 4, water (176 grams for every 100 grams used to make the pre-dispersion) was added dropwise over a period of about one hour with reflux continuing. After 30 minutes the mixture was distilled to remove the isopropanol and sufficient water to obtain a Brookfield viscosity of about 100 cps.

In this manner to the drier-containing predispersion above was added dropwise 88 grams of distilled water. After stirring for 30 minutes at a slow reflux temperature, the dispersion was distilled to remove the 50 grams of isopropanol and 21 grams of water as an aqueous azeotrope plus an additional 42 grams of water to give a 40% solids aqueous dispersion having a brookfield viscosity of 110 cps. This dispersion was a clear enamel capable of use as a protective coating.

Example 6

This example shows the preparation of a $TiO_2$ pigmented sprayable waterborne enamel.

A fully formulated, pigmented water-borne ion-containing alkyd enamel was prepared from the dispersion of Example 5. To effect a satisfactory rutile titanium dioxide pigment dispersion in this aqueous system, it was first necessary to adjust the viscosity of a portion of the dispersion by distilling out additional water until a Gardner-Holdt viscosity of Z1-Z3 (40 Stokes, 4000 centipoise). The pigment grind was conducted on this higher viscosity vehicle. Rheological additives and anti-settling agents were also added to the grind as needed. Final letdown to spray viscosity was with distilled water.

To prepare this higher viscosity aqueous dispersion, the final (40% solids) pre-dispersion of Example 5 was further distilled to remove an additional 25 grams of water to give a 50% solids aqueous dispersion having a Brookfield viscosity of 4200 cps.

To 100 grams of this dispersion was added 33.3 grams R-900 (DuPont) rutile titanium dioxide pigment. A thin blade laboratory blender was used to effect dispersion. Dispersion was complete when the Hegman grind fineness value reached at 7.5 to 8.0. A flow control aid, 3M Company's FC430, 0.05 g, (0.01%) was added as this white enamel was reduced to spray viscosity (100 cps) with distilled water.

Example 7

This example shows the coating properties of these enamels.

Both the clear waterborne enamel of Example 5 and the pigmented enamel of Example 6 were spray applied onto 26 gauge iron phosphate pre-treated metal panels. The films were allowed to air-dry for 7 days prior to testing. The test results are given in Table 1 along with a solvent-borne control, formula HA-9-IN published in Bulletin N-286A available from Eastman Chemical Company, Kingsport, Tenn.

TABLE 1

| Properties of Ion-Containing Alkyd Enamels | | | |
|---|---|---|---|
| Properties | Clear Enamel (Example 5) | Pigmented Enamel (Example 6) | Typical Alkyd Control (From Solvent) |
| Dry Time | | | |
| Set to Touch, min. | 25 | 20 | 5 |
| Tack Free Time, hrs. | 4.5 | 3.5 | 3 |
| Gloss, 60°/20° | 93/80 | 90/77 | 92/81 |
| Pencil Hardness | 1B | HB | 3B |
| Cross-Hatch Adhesion | Good | Good | Good |
| ⅛" Conical Mandrel Flexibility | Pass | Pass | Pass |
| MEK Double Rubs (Solvent Resistance) | 50 | 50 | 50 |
| Water Resistance, 48 hrs at 25° C. | Recovers | No Effect | Recovers |

The above table illustrates that the waterborne enamels of the present invention dry slower than the solventborne control but otherwise have comparable chemical and physical properties.

Example 8

This example illustrates another embodiment of this invention, a mono-functional monomer containing a sulfonate group. 3-sodiosulfobenzoic acid (SSBA), was incorporated into an alkyd resin from which waterborne enamel was prepared. The enamel could be air-dried by adding suitable catalysts.

As described below, SSBA was first reacted with a triol, trimethylolpropane, followed by the addition of TOFA in the second stage; the resulting mixture was then reacted with NPG and IPA to yield a clear, honey-colored resin. The final product (according to a preferred method) was isolated as 80% solids by adding the co-solvent, isopropanol. The aqueous enamel can then be prepared by adding the driers to the resin solution and slowly diluted with water.

To a three-neck, round bottom flask equipped with a mechanical stirrer, a steam jacketed partial-condenser, a Dean-Stark trap, and a water condenser were charged the following reactants: TMP 28.75 g (0.21 mole), SSBA 5.0 g (0.02 mole), and the catalyst, Fascat 4100, 0.2 g. The mixture was heated to 150° C. and stirred under a nitrogen atmosphere. The temperature was then gradually increased to 220° C. and the distillate (water) collected in the Dean-Stark trap. After one hour the acid number was determined to be close to zero, and the mixture was cooled to 150° C. Tall oil fatty acid 53.8 g (0.19 mole) was then added to the mixture and stirred at 220° C. for about one hour to obtain the desired amount of the distillate. The third stage reactants, NPG 29.35 g (0.28 mole) and IPA 61.20 g (0.37 mole), were then added and the reaction was allowed to continue for additional four hours to yield a resin with an acid number of 5 and a number average molecular weight of 1800. The resulting resin was then cooled to 80° C. and isopropanol 40.25 g added to give a resin with 80% solids.

Example 9

This example shows the preparation of the enamel from alkyd resin containing 3-sodiosulfobenzoic acid.

To the above resin of Example 7 12.5 g were added Cobalt Hydro-Cure II (5%) 0.15 g, Zirconium Hydro-CEM (12) 0.15 g, and Dow-Corning 14. The mixture was then stirred and water 15 g gradually added to give a milky, bluish aqueous dispersion. The resultant enamel was applied to a cold-rolled steel test panel and allowed to dry in air for seven days. The coating showed gloss 60/20=95/76, hardness 3B, and MEK double rubs 50.

Example 10

Listed below in Table 2 are several commercial "waterborne" alkyd resins along with their solvent content. The solvent content was provided by the vendor. This table shows that the VOC is quite high even in "waterborne" alkyd resins.

TABLE 2

| Profile of Alkyd Resins From Vendor Advertised Data | | | |
|---|---|---|---|
| Resin/Supplier | Oil Type | Solvent System | Percent Solvent |
| AQUAMAC 1036 | Tall Oil | propoxypropanol + | 25 |

TABLE 2-continued

| Profile of Alkyd Resins From Vendor Advertised Data | | | |
|---|---|---|---|
| Resin/Supplier | Oil Type | Solvent System | Percent Solvent |
| McWhorter | Fatty Acid | sec-butanol | |
| KELSOL 3931 Reichhold | Linseed | butoxyethanol | 54–56 |
| CARGILL 74-7476 Cargill | Fatty Acid | butoxyethanol + sec-butanol | 25 |
| AQUAMAC 1095 McWhorter | Tall oil Fatty Acid | butoxyethanol | 25 |
| AQUAMAC 1090 McWhorter | Vegetable Fatty Acid | butoxyethanol + n-butanol + isobutanol | 25 |
| AQUAMAC 1039 McWhorter | Tall oil Fatty Acid | propoxypropanol + sec-butanol + cyclohexanone | 25 |

Example 11 (Comparative)

This example illustrate single reactor attempts to synthesize usable water-reducible alkyd resins.

A number of attempts were made to prepare ion-containing alkyds which could be useful in formulating water-reducible, curable alkyd enamels. These attempts were made using single-reactor processes, single stage and multiple stages. The results are illustrated below in Table 3. It is surprising that none of these procedures produced an acceptable product.

TABLE 3

| Initial Attempts to Synthesize Water-Reducible Alkyd Resins | | | | |
|---|---|---|---|---|
| Run Number | First Stage | Second Stage | Third Stage | Description of Product |
| 1 | All Monomers From Example 1 | | | Large lumps of solids - agitator impaired |
| 2 | NPG/TMP/ TOFA | IPA/PA/ SIP | | Sand-like material forms in second stage |
| 3 | TMP/TOFA/ SIP | IPA/NPG | | Lumps form in second stage |
| 4 | NPG/SIP/ TMP | TOFA | IPA | Large lump forms around stirrer shaft |
| 5 | ½NPG/PE/ TOFA | ½NPG/SIP | IPA | Solids formed throughout reaction |
| 6 | NPG/SIP | IPA/TMP | TOFA | Clear resin; bimodal GPC |
| 7 | NPG/SIP | IPA/TMP/ TMA | TOFA | distribution - enamel would not cure. |

Key: SIP = 5-sodiosulfoisophthalic acid
NPG = 2,2-dimethyl-1,3-propanediol
PE = pentaerythritol
IPA = isophthalic acid
PA = phthalic anhydride
TOFA = tall oil fatty acid
TMA = trimellitic anhydride
TMP = trimethylolpropane The amounts of each monomer are as given in Example 1. When used, PA replaces ½ of IPA, TMA replaces ½ of TMP, and PE replaces TMP on the basis of the same number of equivalents.

Table 3 shows the negative results typical of such attempts. Each row represents a series of staged reactions whereby the products of each stage are polymerized to about 99 percent extent of acid reaction before the next stage reactants are charged to the reactor.

The products obtained through the staging outlined in Table 3 were either:

(a) bimodal—gel permeation chromatographic analyses showed a physical mixture of two products characterized by number average molecular weight as probably: (i) an oil-free polyester and (ii) mono-and di-esters of the unsaturated fatty acid and triol monomers portion of the reactor charge; or (b) lumpy or granular—the product consisted of high melting, insoluble solids dispersed in a low melting liquid. The solids were completely insoluble in normal paint formulating solvents.

We claim:

1. A process for the preparation of water-dissipatable alkyd resins comprising reacting:
   (a) about 30 to 80 weight percent of a monobasic fatty acid, fatty ester or naturally occurring, partially saponified oil,
   (b) about 10 to 40 weight percent of a glycol or polyol,
   (c) about 10 to 40 weight percent of a polycarboxylic acid, and
   (d) 2 to about 10 weight percent of a sulfomonomer or sulfomonomer adduct containing at least one sulfomonomer group, wherein the weight percent is based on the weight of sulfomonomer or sulfomonomer group, wherein, when the weight percentages of (a) through (d) are converted to their respective moles and equivalents, the total number of moles, $M_t$, divided by the total equivalents of acid functionality, $E_a$, is between 1.0 and 1.5 (K value); and the total equivalents of hydroxyl functionality, $E_{OH}$, divided by the total equivalents of acid functionality, $E_a$, is between 1.0 and 2.0 (R value).

2. The process according to claim 1 wherein said monobasic fatty acid, fatty ester, or naturally occurring, partially saponified oil of (a) is of the formulae

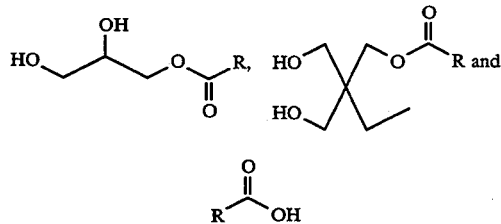

respectively, wherein R is selected from acid esters of the group consisting of linoleic, linolenic, linic, oleic, and mixtures thereof.

3. The process according to claim 1 wherein said glycol or polyol of (b) is selected from aliphatic, alicyclic, and aryl alkyl glycols.

4. The process according to claim 3 wherein said glycol or polyol is selected from the group consisting of ethylene glycol; propylene glycol; diethylene glycol; triethylene glycol; tetraethylene glycol; pentaethylene glycol; hexaethylene glycol; heptaethylene glycol; octaethylene glycol; nonaethylene glycol; decaethylene glycol; 1,3-propanediol; 2,4-dimethyl-2-ethyl-hexane-1,3-diol; 2,2-dimethyl-1,2-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-tetramethyl-1,6-hexanediol; thiodiethanol; 1,2-cyclohexanedimethanol; 1,3-cyclohexanedimethanol; 1,4-cyclohexanedimethanol; 2,2,4-trimethyl-1,3-pentanediol; 2,2,4-tetramethyl-1,3-cyclobutanediol; p-xylenediol hydroxypivalyl hydroxypivalate; 1,10-decanediol; and hydrogenated bisphenol A; trimethylolpropane; trimethylolethane; pentaerythritol; erythritol; threitol; dipentaerythritol; sorbitol; glycerine; and dimethylolpropionic acid.

5. The process according to claim 1 wherein said polycarboxylic acid of (c) is selected from the group consisting of isophthalic acid, terephthalic acid, phthalic anhydride(acid), adipic acid, tetrachlorophthalic anhydride, dodecanedioic acid, sebacic acid, azelaic acid, 1,4-cyclohexanedicarboxylic acid, 1,3-cyclohexanedicarboxylic acid, maleic anhydride, fumaric acid, succinic anhydride(acid), 2,6-naphthalenedicarboxylic acid, glutaric acid, trimellitic anhydride, pyromellitic dianhydride and esters thereof.

6. The process according to claim 1 wherein said sulfomonomer of (d) is a sulfomonomer adduct that has been prepared by reacting a sulfomonomer containing at least one sulfonate group with a polyol to produce a diol sulfomonomer adduct.

7. The process according to claim 6 wherein said polyolsulfomonomer adduct is prepared by reacting a monofunctional sulfomonomer containing at least one sulfonate group with a polyol containing at least three hydroxyl groups.

8. The process according to claim 7 wherein said monofunctional sulfomonomer is selected from the group consisting of the formulae:

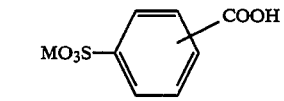

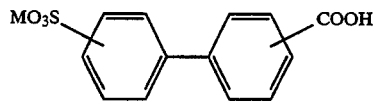

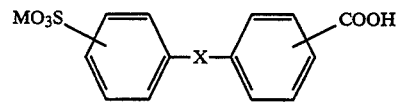

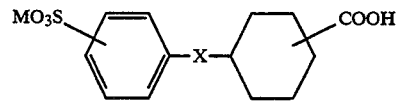

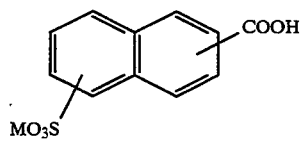

wherein M is Na+, K+, or NH4+ and X is O, S, CH2, or SO2.

9. The process according to claim 8 wherein said monofunctional sulfomonomer is 3-sodiosulfobenzoic acid.

10. The process according to claim 7 wherein said polyol is selected from the group consisting of trimethylolethane, glycerine, pentaerythritol, erythritol, threitol, dipentaerythritol, sorbitol, and trimethylolpropane.

11. The process according to claim 6 wherein said polyol sulfomonomer adduct is prepared by reacting a difunctional sulfomonomer with a polyol.

12. The process according to claim 11 wherein said polyol is a diol selected from the group consisting of ethylene glycol, diethylene glycol, 2,2,4-trimethyl-1,3-pentanediol, 1,4-cyclohexanedimethanol, 1,3-cyclohexanedimethanol, hydroxypivalyl, hydroxypivalate, dipropylene glycol, 1,6-hexanediol, 1,10-decanediol, 1,3-butanediol, hydrogenated bisphenol A, 1,4-butanediol and neopentyl glycol.

13. The process according to claim 11 wherein said difunctional sulfomonomer is selected from the group consisting of 5-sodiosulfoisophthalic acid, dimethyl 5-sodiosulfoisophthalate, lithium 5-sulfoisophthalic acid, dimethyl lithium 5-sulfoisophthalate, potassium 5-sulfoisophthalic acid, and dimethyl potassium 5-sulfoisophthalate.

14. The process according to claim 1 wherein said monobasic fatty acid, fatty ester, or naturally occurring, partially saponified oil has been prepared by reacting a fatty acid or oil with a polyol.

15. The process according to claim 14 wherein said polyol is selected from trimethylolethane, pentaerythritol, erythritol, threitol, dipentaerythritol, sorbitol, glycerine, dimethylolpropionic acid, and trimethylolpropane.

16. The process according to claim 14 wherein said monobasic fatty acid, fatty ester, or naturally occurring, partially saponified oil is prepared from an oil selected from the group consisting of sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower, tallow oil and walnut oil.

17. The process according to claim 14 wherein said monobasic fatty acid, fatty ester, or naturally occurring, partially saponified oil is prepared from fatty acids selected from the group consisting of oil derived fatty acids, tallow acid, linoleic acid, oleic acid, soya acid, myristic acid, linseed acid, crotonic acid, versatic acid, coconut acid, tall oil fatty acid, rosin acid, neodecanoic, neopentanoic, isostearic, 12-hydroxystearic, and cottonseed acid.

18. A composition comprising a water-dissipatable alkyd resin made of the moieties of reaction products:
   (a) about 30 to 80 weight percent of a monobasic fatty acid, fatty ester or naturally occurring, partially saponified oil,
   (b) about 10 to 40 weight percent of a glycol or polyol,
   (c) about 10 to 40 weight percent of a polycarboxylic acid, and
   (d) 2 to about 10 weight percent of a sulfomonomer or sulfomonomer adduct containing at least one sulfomonomer group, wherein the weight percent is based on the weight of sulfomonomer or sulfomonomer group, wherein, when the weight percentages of (a) through (d) are converted to their respective moles and equivalents, the total number of moles, $M_t$, divided by the total equivalents of acid functionality, $E_a$, is between 1.0 and 1.5 (K value); and the total equivalents of hydroxyl functionality, $E_{OH}$, divided by the total equivalents of acid functionality, $E_a$, is between 1.0 and 2.0 (R value).

19. The process according to claim 1 wherein (d) is present in an amount of about 3 to 9 weight percent.

* * * * *